United States Patent [19]
Thomson et al.

[11] Patent Number: 5,897,848
[45] Date of Patent: Apr. 27, 1999

[54] PROCESS FOR PRODUCING HYPOPHOSPHITE COMPOUNDS

[75] Inventors: Donald W. Thomson, Northport; Luis Henry Garay, Rockville Centre; Jason D. Horowitz, Hewlett, all of N.Y.

[73] Assignee: LeaRonal Inc., Freeport, N.Y.

[21] Appl. No.: 08/934,100

[22] Filed: Sep. 19, 1997

[51] Int. Cl.⁶ .................................................. C01B 25/165
[52] U.S. Cl. ............................................ 423/305; 23/302 T
[58] Field of Search ............................ 423/305; 23/302 T

[56] References Cited

U.S. PATENT DOCUMENTS 5,522,972  6/1996  Nobel et al. .
5,716,419  2/1998  Larsen ................................. 23/302 T

FOREIGN PATENT DOCUMENTS 139245    11/1966  Czechoslovakia .
152901    4/1974   Czechoslovakia .
7-02810   6/1995   Japan .
97/02809  6/1995   Japan .

*Primary Examiner*—Wayne Langel
*Attorney, Agent, or Firm*—Lerner, David, Littenberg, Krumholz & Mentlik

[57] ABSTRACT

Methods for the production of nickel or ammonium hypophosphite are disclosed, including combining sodium hypophosphite with nickel or ammonium sulfate to produce sodium sulfate and nickel or ammonium hypophosphite, and lowering the temperature of the solution containing the sodium sulfate to crystallize out the sodium sulfate.

9 Claims, 1 Drawing Sheet

PROCESS FOR PRODUCING HYPOSPHITE COMPOUNDS

FIELD OF THE INVENTION

The present invention is directed to the production of nickel or ammonium hypophosphite. More particularly, the present invention is directed to continuous processes for the production of such hypophosphites. Still more particularly, the present invention relates to crystallization methods for preparing such hypophosphites.

BACKGROUND OF THE INVENTION

Cationic hypophosphite compounds, such as nickel and ammonium hypophosphite, are rather expensive materials which have been used in electroless nickel plating baths along with hypophosphorous acid in order to eliminate both sodium and sulfate ions from these baths and extend the life thereof. In order to justify the increased cost of processes for producing nickel or ammonium hypophosphite so as to warrant this commercial utilization various methods have been devised, including most recently that of U.S. Pat. No. 5,522,972 assigned to the assignee of the present application.

In addition, efforts have also continued to produce nickel hypophosphite utilizing a crystallization process. This generally includes reacting hypophosphorous acid with nickel hydroxide or nickel carbonate, or some other suitable nickel compound. The problem with this method is the high cost and limited availability of hypophosphorous acid, as well as the expense of the nickel compounds as compared to the cost of nickel sulfate in commercial use.

Czech Patents Nos. 139,245 and 152,901 describe methods for producing nickel hypophosphite which do not use the expensive hypophosphorous acid. In these patents, nickel nitrate in an aqueous solution, is mixed with aqueous sodium hypophosphite. The nickel hypophosphite crystallizes out of solution because it is the least soluble material in the mixture and is easily separated. The filtrate is presumably discarded as waste. This is a very simple method for producing nickel hypophosphite. However, there is sufficient sodium hypophosphite and nickel hypophosphite left in the filtrate to cause this method to be very expensive. Thus, these expensive materials would be discarded in the waste stream, requiring expensive clean-up treatment. Similar processes are disclosed in Japanese Patent Nos. 97/02,809 and 97/02,810, which patents thus disclose contacting nickel hydroxide or nickel carbonate with hypophosphorous acid in water at 40° to 80° C., followed by cooling to crystallize the nickel hypophosphite product, as well as reacting nickel chloride with sodium hypophosphite in aqueous solution, followed by crystallization to produce the nickel hypophosphite. In each of these processes the waste streams would contain nickel and hypophosphite ions as well as the corresponding sodium salt, such as sodium nitrate, when nickel nitrate is used as described in the Czech patents discussed above, or sodium chloride when nickel chloride is used, as described in the above-referred-to Japanese patent. Furthermore, whereas the Czech patent mentions that nickel sulfate can be used, this too would result in sodium sulfate being present in the waste stream, together with nickel and hypophosphite ions.

The search has therefore continued for a simpler and more economical and more efficient way to produce such cationic hypophosphites.

SUMMARY OF THE INVENTION

In accordance with the present invention these and other objects have now been realized by the discovery of a method for the production of nickel or ammonium hypophosphite which comprises combining sodium hypophosphite with nickel or ammonium sulfate, so as to produce sodium sulfate and the nickel or ammonium hypophosphite, and lowering the temperature of a solution containing the sodium sulfate to crystallize out the sodium sulfate.

In accordance with one embodiment of the method of the present invention, the method includes lowering the temperature of the solution containing the sodium sulfate to a temperature of between about −10° C. and 10° C.

In accordance with another embodiment of the method of the present invention, the solution containing the sodium sulfate comprises the direct product of the combining step. In another embodiment, the solution containing the sodium sulfate comprises the indirect product of the combining step.

In accordance with a preferred embodiment of the method of the present invention, the method for the production of nickel hypophosphite comprises combining sodium hypophosphite with nickel sulfate so as to produce sodium sulfate and the nickel hypophosphite, and lowering the temperature of a solution containing the sodium sulfate to crystallize out the sodium sulfate.

In accordance with one embodiment of this method of the present invention, the method includes separating or filtering off the nickel hypophosphite from the sodium sulfate, thereby providing a waste stream containing the sodium sulfate, the waste stream comprising the solution containing the sodium sulfate, and lowering the temperature of this waste stream to crystallize out the sodium sulfate and provide a filtrate stream containing nickel, sodium and hypophosphite ions. Preferably, the method includes recycling the filtrate stream provided in the crystallizing step and containing nickel, sodium and hypophosphite ions to the combining step.

In accordance with another embodiment of this method of the present invention, the method includes recovery of the small amount of nickel that may be present in the sodium sulfate crystals, by dissolving the crystallized sodium sulfate in water, raising the pH of the dissolved sodium sulfate to a pH of between about 8 and 10 by adding alkali metal hydroxide thereto, whereby nickel hydroxide precipitates therefrom, dissolving the nickel hydroxide in an acid containing sulfate ions, so as to provide nickel sulfate, and recycling the nickel sulfate to the combining step. Preferably, the acid comprises sulfuric acid.

In accordance with another embodiment of the method of the present invention, a method for the production of ammonium hypophosphite comprises combining sodium hypophosphite with ammonium sulfate so as to produce sodium sulfate and the ammonium hypophosphite, and lowering the temperature of a solution containing the sodium sulfate to crystallize out the sodium sulfate to provide a filtrate stream containing ammonium and hypophosphite ions.

In accordance with one embodiment of this method of the present invention, the solution containing the sodium sulfate comprises the direct product of the combining step.

BRIEF DESCRIPTION OF THE DRAWINGS

The present invention will be more fully appreciated with reference to the following detailed description, which, in turn, refers to the Drawings, in which.

DETAILED DESCRIPTION

Figure 1:
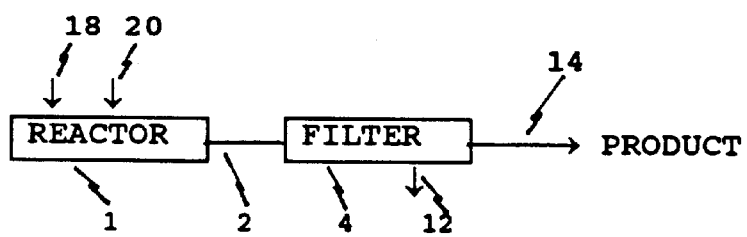
FIG. 1 is a schematic representation of one embodiment of the method of the present invention.

The present invention resulted from attempts to improve upon prior art methods of producing cationic hypophosphite compounds such as nickel and ammonium hypophosphite by mixing concentrated solutions of cationic salts, such as nickel or ammonium salts, with concentrated solutions of sodium hypophosphite. Thus, even where such systems have suggested the potential use of nickel salts such as nickel sulfate, each of these systems have resulted in the production of waste streams containing salts such as sodium nitrate and sodium sulfate, along with nickel or ammonium and hypophosphite ions, which create potential environmental problems, and which also rendered these systems unfeasible from an economic standpoint, and generally unacceptable on a commercial basis. In accordance with this invention, however, the waste streams which are created can be reused, thereby preventing waste streams from being created which include unacceptable and environmentally damaging solutions, and in the case of nickel hypophosphite, both the nickel and hypophosphite ions can be salvaged and reused.

The process of the present invention thus begins with specified concentrated solutions of nickel or ammonium sulfate salts and concentrated solutions of sodium hypophosphite, and in which the sulfate salts have been particularly selected so as to be useful in this method. That is, nickel or ammonium sulfates are employed in the method of this invention. These salts result in the preparation of nickel or ammonium hypophosphites, and in the generation of sodium sulfate as well as the desired nickel and ammonium hypophosphites in a condition which is usable in electroless plating processes. The sodium sulfate is thus either produced directly, as in the case of ammonium hypophosphite production, or in the filtrate or waste stream generated after crystallization in the case of nickel hypophosphite production. It must, therefore, be noted that the method of the present invention is particularly used in connection with the preparation of nickel or ammonium hypophosphites which are intended to be used in electroless plating processes. Thus, if there are any impurities in the ultimate hypophosphite compounds produced by this method, they must be such that they will not harm the resultant electroless plating solutions in which they are to be employed. By utilizing nickel or ammonium sulfate salts, sodium sulfate is produced. The generation of sodium sulfate is thus a critical element of the present invention. That is, sodium sulfate is a compound whose solubility in water is many times lower, for example, at 0° C. than it is at 30° C. For this reason, all that is required in order to crystallize out the sodium sulfate is to reduce the temperature by a sufficient amount to crystallize same. Indeed, sodium sulfate has a solubility at 0° C. of about 11 g/100 cc and a solubility at 30° C. of about 92.7 g/100 cc. This greater than eight-fold decrease in solubility with a 30° C. decrease in temperature is essential in accordance with the method of the present invention. This is true even as compared to the alkali metal sulfates, such as lithium or potassium sulfate.

Furthermore, the nickel and ammonium hypophosphite compounds produced in accordance with the present invention will necessarily contain a small amount of the sulfate ion as an impurity. However, since these products are intended to be used in electroless plating processes, the presence of small amounts of sulfate ions will not harm the resultant electroless plating solutions, and are, therefore, fully acceptable therefor.

The concentrated solution of nickel or ammonium sulfate is preferably a solution of between about 200 g/l and 1200 g/l of the sulfate salt, preferably between about 500 g/l and 1200 g/l of the sulfate salt, and most preferably between about 600 g/l and 1200 g/l of the sulfate salt. On the other hand, the concentrated sodium hypophosphite solution generally comprises between about 250 g/l and 1000 g/l of the sodium hypophosphite, preferably between about 500 g/l and 1000 g/l of the sodium hypophosphite, and most preferably between about 700 g/l and 1000 g/l of the sodium hypophosphite. The concentration of the nickel or ammonium sulfate, is preferably as high as possible in order to produce larger amounts of nickel or ammonium hypophosphite. The concentration of sodium hypophosphite is also desirably as high as possible in order to add large amounts of hypophosphite ions to the solution.

In each of the embodiments of the present invention, a solution containing a concentrated solution of sodium sulfate is produced. In one embodiment, with the production of ammonium hypophosphite, the sodium sulfate solution is produced as a direct result of contacting the sodium hypophosphite with a sulfate salt of the ammonium cation. On the other hand, in the case of production of nickel hypophosphite, the nickel hypophosphite is first separated from the nickel hypophosphite compound containing solution produced by the initial combining step in order to provide a waste stream containing the sodium sulfate. It is this concentrated solution of sodium sulfate which is then treated in accordance with this invention. In either case, however, the temperature of either the sodium sulfate stream produced as a direct result of the initial combining step or the filtrate stream produced after separation of the nickel hypophosphite is reduced to a temperature of between about 10° C. and −10° C. so as to crystallize out of solution the alkali metal sulfate.

In the case of sodium sulfate, a very simple and highly economical step is provided since the sodium sulfate is readily separated from solution by cooling the solution, as is discussed above. Thus, by reducing the temperature sufficiently, i.e., the lower the temperature is reduced, the greater the amount of crystallization which occurs, the sodium sulfate impurity will readily crystallize out of the solution for collection.

In the embodiment of this invention in which ammonium hypophosphite is produced, the combining of sodium hypophosphite with ammonium sulfate produces a solution of sodium sulfate and ammonium hypophosphite in which the sodium sulfate is the least soluble material in solution. Therefore, it is in this embodiment that the sodium sulfate can be immediately crystallized out of the solution by lowering the temperature in accordance with the discussion above. Therefore, after filtration of these sodium sulfate crystals, the filtrate will contain the desired final ammonium hypophosphite contaminated only slightly with a small amount of sodium sulfate. This amount will be negligible and will not interfere with the intended use of the ammonium hypophosphite in electroless plating baths. The sodium sulfate crystals themselves will include only negligible amounts of ammonium and hypophosphite ions, which are non-poisonous, and which can, therefore, be discarded as a waste stream therefrom.

On the other hand, in the case of the embodiment of the present invention in which nickel hypophosphite is produced, combining of the sodium hypophosphite with nickel sulfate produces a solution of nickel hypophosphite and sodium sulfate in which the nickel hypophosphite is now the least soluble material in solution. In this case, initial separation of crystals of the nickel hypophosphite can be carried out by cooling the mixture to a temperature below ambient. However, it is most preferred that ambient or room temperature be employed, in order to minimize the presence of impurities such as the sodium sulfate present therein from the crystals so generated. That is, since the nickel hypophosphite in this case is by far the least soluble salt in the mixture produced in this process, it readily crystallizes out of solution, and lowering of the temperature, while possibly accelerating that process, might also assist in the crystallization of more soluble compounds therein, such as the sodium sulfate. In any event, these crystals can then be separated out by filtration. Such filtration itself is carried out in a conventional manner, and the recovered nickel hypophosphite, which is a principal object of this entire process, can be separated out and utilized in electroless nickel plating processes and the like.

Filtration of the nickel hypophosphite compound in this case thus produces a filtrate solution which contains a concentrated solution of the sodium sulfate. This filtrate also includes some amount of nickel and hypophosphite ions. It is this stream of sodium sulfate solution which is then reused and salvaged according to the present invention. Thus, the temperature of this filtrate stream is reduced, as is discussed above, to a temperature of between about 10° C. and −10° C. so as to crystallize out of solution the sodium sulfate.

The filtrate produced in this crystallization step now includes additional cations and hypophosphite ions as well as a small amount of sodium sulfate This solution principally comprises sodium hypophosphite ions, with small amounts of nickel ion, and the sulfate ions can thus be recycled back to the original contacting step between the sodium hypophosphite and the nickel sulfate. Then, additional nickel sulfate and additional sodium hypophosphite are combined with the recycle stream, and the process can be repeated.

Returning to the crystallization step for crystallizing out the sodium sulfate from solution, in the case of the filtrate stream prepared in the case of nickel hypophosphite production, the crystals themselves will contain small amounts of nickel cation as an impurity. Therefore, these crystals cannot be readily discarded as a waste stream. In a batchwise process, these crystals can thus be collected after a number of batches and separately dissolved in water. To then salvage and reuse the nickel impurity contained in these crystals, the solution thus prepared is then treated as follows. The pH of this solution is initially raised to a pH of between about 8 and 10. This is preferably accomplished by the addition of alkali metal hydroxide, such as sodium hydroxide, in order to precipitate out nickel hydroxide, which can then be filtered off. The nickel hydroxide compound which precipitates is then dissolved in a dilute acid of the sulfate ion, such as sulfuric acid, to produce nickel sulfate for recycle back to the original combination step. Thus, the only residue from this entire process, aside from materials being recycled for further use, is a dilute stream of sodium sulfate, which is nontoxic and nonpolluting.

Again, the nickel or ammonium hypophosphite which is produced according to the method of the present invention will be relatively pure, but will include a small amount of sodium sulfate, as well as a small amount of sodium hypophosphite as impurities. However, materials such as these will not interfere with the intended use of these hypophosphite compounds, such as in electroless plating solutions.

Ammonium hypophosphite can thus be produced in accordance with the present invention by reference to the schematic representation shown in FIG. 1. In this case, a concentrated solution of sodium hypophosphite is fed to reactor 1 through line 18, and a concentrated solution of ammonium sulfate is fed to reactor 1 through line 20. Reactor 1 is thus a batch reactor which is maintained at a temperature of between about −10° C. and 10° C. The mixture of the concentrated sodium hypophosphite and the ammonium sulfate thus produces the sodium sulfate and ammonium hypophosphite therein. Since in this solution the sodium sulfate is less soluble than the ammonium hypophosphite, the sodium sulfate can be crystallized out of this solution in reactor 1. Thus, the sodium sulfate crystallizes out of this solution, which is passed through line 2 to filter 4 for filtering thereof. The filter cake is withdrawn through line 12 where it can be air dried or otherwise disposed of as a waste stream. The ammonium hypophosphite produced in accordance with the method as shown in FIG. 1 is thus withdrawn through line 14 as filtrate. It will thus contain some sodium sulfate, but the amount is such that it can be used directly in electroless plating processes as discussed hereinabove.

Figure 2:
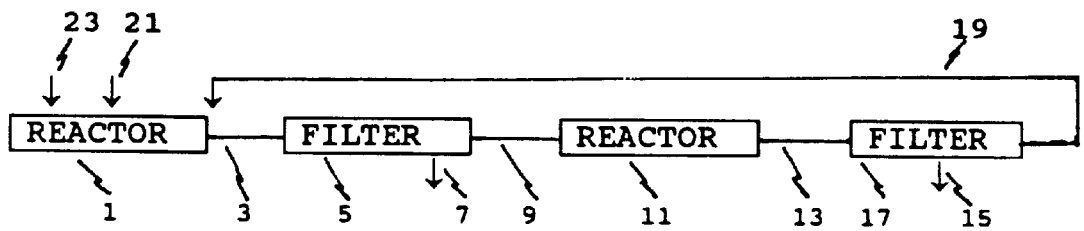
FIG. 2 is a schematic representation of another embodiment of the method of the present invention.

Turning to FIG. 2, nickel hypophosphite can be produced in accordance with the present invention. Thus, a concentrated solution of sodium hypophosphite is fed to reactor 1 through line 23, and a concentrated solution of a nickel sulfate is fed to reactor 1 through line 21. Reactor 1 is thus a batch reactor which is maintained at room temperature. The pH in reactor 1 is maintained between about 1 and 3. The mixture of the concentrated sodium hypophosphite and the nickel sulfate thus produces the nickel hypophosphite-compound-containing solution in line 3. The nickel hypophosphite compound is then crystallized from this solution at ambient temperatures and filtered in filter 5. The filter cake is preferably air dried and is withdrawn through line 7 for that purpose. Thus, the product of this process, namely the nickel hypophosphite itself, is removed through line 7 for use in electroless plating solutions and the like. The filtrate produced in this crystallization step is then passed through line 9 to reactor 11 in which the filtrate is treated in an open container and cooled to a temperature of between about −10° C. and 10° C. without pH control. Thus, the sodium sulfate crystallizes out of the filtrate stream and is passed through line 13 to filter 15 for filtering thereof. The filter cake is withdrawn through line 17 where it can be air dried or used in the manner discussed below. The filtrate stream produced in filter 15 comprises sodium hypophosphite as well as minor amounts of nickel and sulfate ions, which are recycled back to the original contacting step in reactor 1 through line 19. At this point, in addition to the above, the crystals of sodium sulfate withdrawn through line 17 can be dissolved in water, the pH adjusted to between about 8 and 10 by the addition of alkali metal hydroxide, and nickel hydroxide precipitated therefrom. This nickel hydroxide can then be filtered, collected, and dissolved in dilute acid-containing sulfate ions for recycling of the cationic salt of the sulfate ion back to the initial step in reactor 1. The filtrate therefrom, primarily comprising a dilute stream of sodium sulfate, can be discarded therefrom.

EXAMPLE I

Nickel hypophosphite was produced in accordance with the method of the present invention in a series of runs. In this series of runs, a concentrated solution of 700 g/l sodium hypophosphite was initially contacted with a concentrated solution of 600 g/l of nickel sulfate hydrate in a batch comprising a total volume of 1350 ml at about room temperature. The pH was between 1 and 3. The nickel hypophosphite product was then crystallized at ambient temperature, and the filter cake was then air dried. The filtrate from this crystallization step was separately treated in an open container and cooled to a temperature of between 0° C. and 5° C., without pH control. Sodium sulfate thus crystallized out and was filtered, producing a filtrate stream for recycle sodium hypophosphite, as well as a minor amount of nickel sulfate ions. This stream was recycled back to the original contacting step. These crystals included a small amount of nickel as an impurity. The crystals were then dissolved in water, the pH adjusted to a pH of from 8 to 10 with sodium hydroxide, and nickel hydroxide precipitated therefrom. The nickel hydroxide was then filtered, collected, dissolved in dilute sulfuric acid, and recycled back to the initial combination step with sodium hypophosphite and nickel sulfate. The results obtained in five separate runs of this procedure in terms of the amount of each of the ingredients produced is set forth below in Table I.

TABLE 1

| Run | Reactants (gms) $Na(H_2PO_2)_2.H_2O$ | Ni metal as (gms) $NiSO_4.6H_2O$ | Product (gms) (crystals) $Ni(H_2PO_2)_2.6H_2O$ | Recycle (gms) (crystals) $NaSO_4$ | $Na(H_2PO_2)_2H_2O$ |
|---|---|---|---|---|---|
| 1 | 700 | 48.8 | 184.0 | 206 | — |
| 2 | 130 | 30.6 | 128.0 | 192 | 567 |
| 3 | 130 | 30.6 | 123.4 | 180 | 541 |
| 4 | 130 | 30.6 | 121.4 | 185 | 546 |
| 5 | 130 | 30.6 | 126.3 | 182 | 556 |

Although the invention herein has been described with reference to particular embodiments, it is to be understood that these embodiments are merely illustrative of the principles and applications of the present invention. It is therefore to be understood that numerous modifications may be made to the illustrative embodiments, and that other arrangements may be devised without departing from the spirit and scope of the present invention as defined by the appended claims.

We claim:

1. A method for the production of nickel hypophosphite comprising combining sodium hypophosphite with nickel sulfate so as to produce sodium sulfate and said nickel hypophosphite, separating said nickel hypophosphite from said sodium sulphate, thereby providing a waste stream containing said sodium sulphate, and lowering the temperature of said waste stream containing said sodium sulfate to crystallize out said sodium sulfate and provide a filtrate stream containing nickel, sodium and hypophosphite ions.

2. The method of claim 1 wherein said separating of said nickel hypophosphite from said sodium sulfate is carried out at about room temperature.

3. The method of claim 1 wherein said crystallizing out of said sodium sulfate provides a filtrate stream including nickel and hypophosphite ions, and including recycling said filtrate stream to said combining step.

4. The method of claim 1 including dissolving said crystallized sodium sulfate in water, raising the pH of said dissolved sodium sulfate to a pH of between about 8 and 10 by adding alkali metal hydroxide thereto, whereby nickel hydroxide precipitates therefrom, dissolving said nickel hydroxide in an acid containing sulfate ions, so as to provide said nickel sulfate, and recycling said nickel sulfate to said combining step.

5. The method of claim 4 wherein said acid comprises sulfuric acid.

6. The method of claim 1 including lowering the temperature of said waste stream containing said sodium sulphate to a temperature of between about −10° C. and 10° C.

7. A method for production of ammonium hypophosphite comprising combining sodium hypophosphite with ammonium sulfate so as to produce sodium sulfate and said ammonium hypophosphite, and lowering the temperature of a solution containing said sodium sulfate to crystallize out said sodium sulfate.

8. The method of claim 7 wherein said crystallizing out of said sodium sulfate provides a filtrate stream containing ammonium and hypophosphite ions.

9. The method of claim 7 wherein said solution containing said sodium sulfate comprises the direct product of said combining step.

* * * * *

UNITED STATES PATENT AND TRADEMARK OFFICE
CERTIFICATE OF CORRECTION

| | | |
|---|---|---|
| PATENT NO. | : 5,897,848 | Page 1 of 1 |
| DATED | : April 27, 1999 | |
| INVENTOR(S) | : Thomson et al. | |

It is certified that error appears in the above-identified patent and that said Letters Patent is hereby corrected as shown below:

<u>Columns 7-8,</u>
Table 1, delete "$Na(H_2PO_2)_2$" all instances and insert therefor -- $NaH_2PO_2$ --.

Signed and Sealed this

Twenty-third Day of July, 2002

*Attest:*

*Attesting Officer*

JAMES E. ROGAN
*Director of the United States Patent and Trademark Office*